Figure 1:
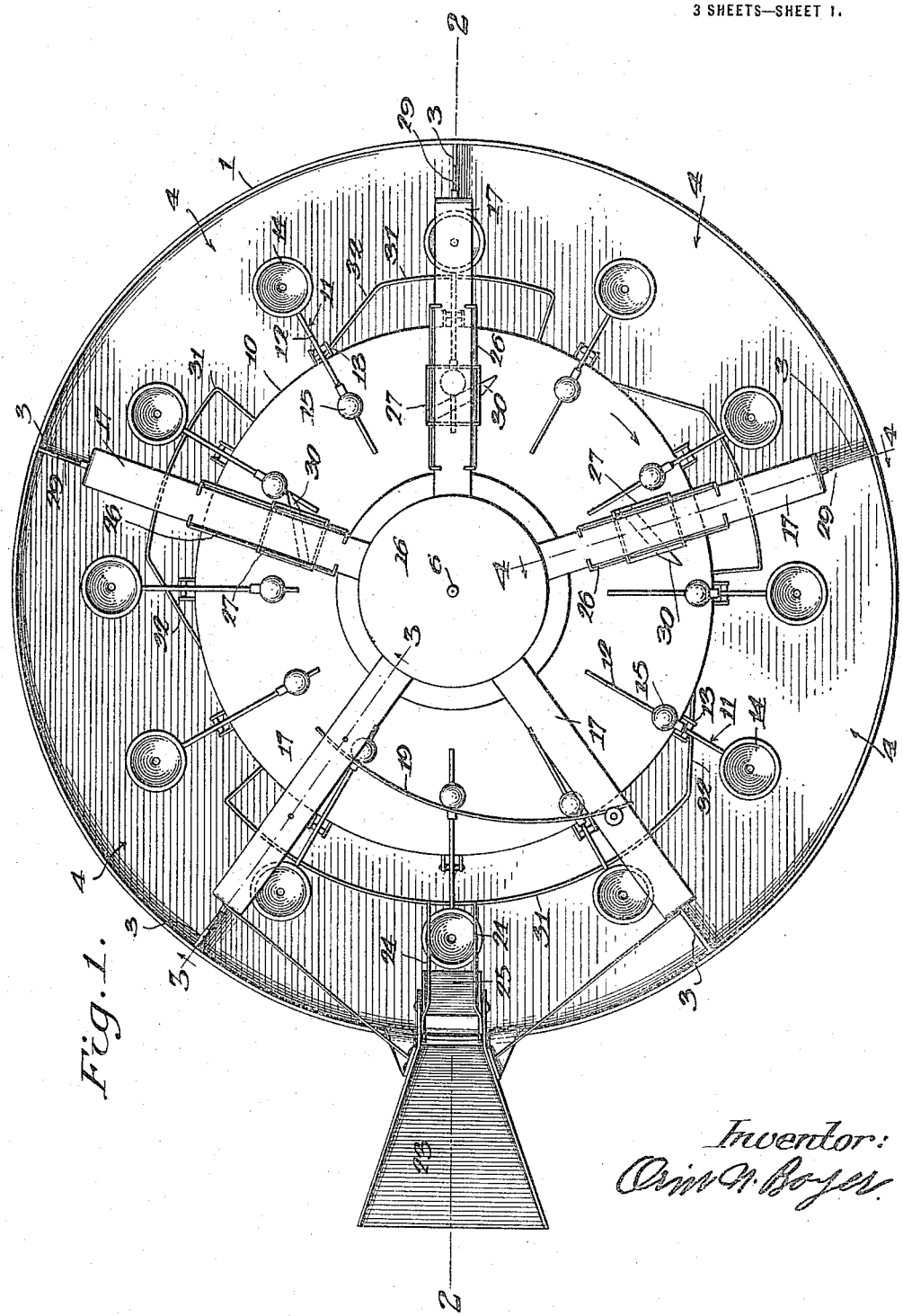

O. N. BOYER.
AUTOMATIC SCALE WEIGHT FRUIT AND VEGETABLE SIZER.
APPLICATION FILED MAR. 13, 1916.

1,222,842.

Patented Apr. 17, 1917.
3 SHEETS—SHEET 1.

Inventor:
Orin N. Boyer.

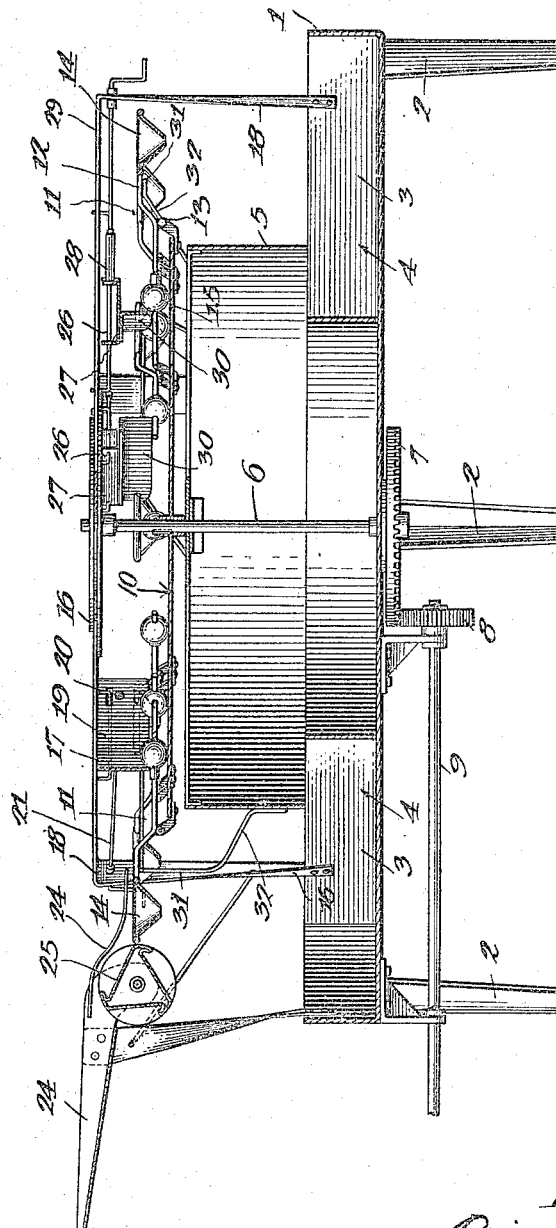

O. N. BOYER.
AUTOMATIC SCALE WEIGHT FRUIT AND VEGETABLE SIZER.
APPLICATION FILED MAR. 13, 1916.
1,222,842.
Patented Apr. 17, 1917.
3 SHEETS—SHEET 3.
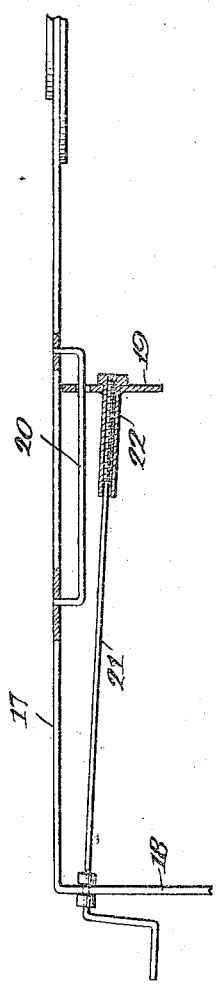
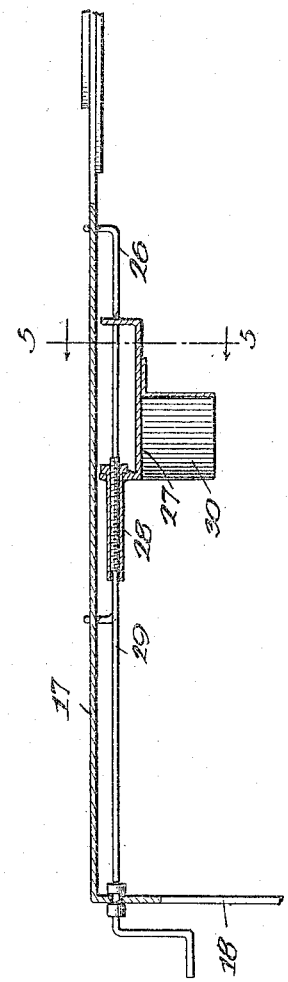
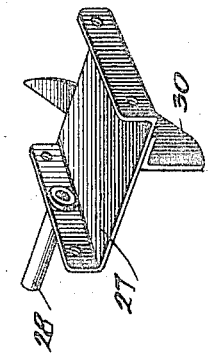
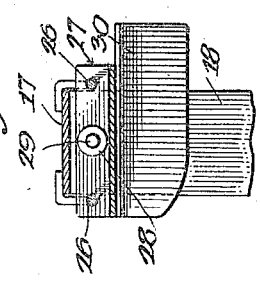
Inventor:
Orin N. Boyer

UNITED STATES PATENT OFFICE.

ORIN N. BOYER, OF ONTARIO, OREGON.

AUTOMATIC SCALE-WEIGHT FRUIT AND VEGETABLE SIZER.

1,222,842.　　　　Specification of Letters Patent.　　Patented Apr. 17, 1917.

Application filed March 13, 1916. Serial No. 83,995.

*To all whom it may concern:*

Be it known that I, ORIN N. BOYER, a citizen of the United States, residing at Ontario, in the county of Malheur and State of Oregon, have invented new and useful Improvements in Automatic Scale-Weight Fruit and Vegetable Sizers; and I do declare the following to be a full, clear, and exact description of the invention, such as will enable others skilled in the art to which it appertains to make and use the same.

My invention aims to provide a simply constructed and inexpensive yet highly efficient and durable machine for accurately separating or sorting numerous kinds of fruits and vegetables into different grades according to the weight thereof and to this end I employ certain novel features of construction and unique combinations of parts to be hereinafter fully described and claimed, the descriptive matter being supplemented by the accompanying drawings which constitute a part of this application and in which:

Figure 1 is a top-plan view of the improved machine;

Figs. 2, 3 and 4 are vertical sections thereof on the planes indicated by the lines 2—2, 3—3 and 4—4 of Fig. 1;

Fig. 5 is a detail vertical section on the plane designated by the line 5—5 of Fig. 4; and Fig. 6 is a perspective view of one of the adjustable carriages which carry the weight shifting cams.

In the drawings above briefly described, the numeral 1 designates a horizontal pan of suitable construction preferably supported on legs 2, said pan having a plurality of radial partitions 3 dividing it into compartments 4 to receive different grades of fruit or vegetables.

A rigid drum 5 preferably is disposed above the pan 1 and is secured in any suitable manner against rotation, being preferably supported on the partitions 3, said drum and the bottom of the pan carrying appropriate bearings in which a vertical shaft 6 is rotatably mounted, the lower end of said shaft being provided with any suitable driving means. In the present showing the shaft 6 is equipped with a gear 7 meshing with another gear 8 on a horizontal driven shaft 9. The upper end of the shaft 6 carries a horizontal rotating table 10 carrying fruit or vegetable distributers 11.

Each distributer 11 consists of a lever 12 fulcrumed between its ends to the table 10 as shown at 13, a fruit or vegetable receiving cup 14 on the outer end of the lever 12 and a sliding weight 15 on the inner end thereof.

A central disk 16 carries a bearing for the extreme upper end of the shaft 6 and a plurality of arms 17 radiate from said disk and are bent downwardly at their outer ends to provide supports 18 riveted or otherwise secured at their lower ends to the partitions 3 or to other suitable parts of the pan 1. Extending beneath two of the arms 17 is a cam plate 19 directed spirally in respect to the edge of the table 10, one end of said plate being pivoted to one of said two arms while the other of said arms carries a horizontal track 20 (see Fig. 3) which adjustably supports the other end of said plate, adjustments being made by means of a screw 21 and a tubular nut 22 into which it extends, said nut being secured rigidly to the plate 19. As the table 10 rotates in the direction of the arrow in Fig. 1 it is the office of plate 19 to shift all of the weights 15 to the inner extremity of the levers 12 to over-balance the weight of the fruit or vegetables carried in the holders 14. As the weights then continue to travel with the table they are shifted outwardly at a number of points so as to permit the load in the holders 14 to over-balance said weights whenever the latter are forced outwardly to the required extent. This causes the proper grading of the fruit or vegetables, the same being deposited to the compartments 4 according to the weight thereof.

The fruit or vegetables to be separated can in some cases be supplied to the holders 14 by hand but by preference a chute 23 is provided from whose inner end a pair of guide fingers 24 extend so as to direct the fruit or vegetables into the holders 14 as the latter pass beneath said fingers, the feeding being controlled by a suitable rotating feeder 25 whose details of construction are not shown or described since they constitute no part of the present invention.

Secured to and disposed below all of the arms 17 with the exception of those carrying the cam plate 19, are a plurality of radial tracks 26 upon which carriages 27 are slidably mounted (see particularly Figs. 4, 5 and 6), said carriages carrying tubular nuts 28 into which the inner ends of the screws 29 are threaded so that rotation of said screws will adjust the carriages 27 inwardly or outwardly as occasion may demand to change the location of the weight shifting cams 30 which depend from said carriages. As shown the tracks 26 are preferably constructed of metal rods bent into shape with their ends secured in any appropriate manner to the arms 17 while for ease of construction the carriages 27 will by preference be constructed of single metal plates with their ends bent upwardly and perforated to form guides traveling on said tracks. The cams 30 may be of the angle metal construction shown or of any other desired construction. It is essential, however, that they be disposed spirally of the direction of travel of the weights 15 so as to shift said weights outwardly as they come in contact therewith, the first of the series of carriages 27 being located rather near the center of rotation while the others gradually increase their distances from said center, this being done so as to cause each cam 30 to shift the weights 15 outwardly to a greater extent, thus all fruit or the like which is not released by the distributers 11 when the first cam 30 is engaged, will be released when one of the succeeding cams shifts the weights 15 farther toward the fulcrums 13.

For returning the distributers 11 to normal position after they have once been tilted downwardly by the weight of their load, cams 31 are provided, these cams being preferably in the form of rods secured at their ends to the drum 5, the front end of each rod or that first engaged by the levers 12 being inclined as indicated at 32 in Figs. 1 and 2, thus causing said levers 12 to be gradually raised.

In operation the carriages 27 will be properly adjusted by means of their screws 29 and the table 10 will be rotated. The fruit or the like to be separated is now fed to the machine by means of the chute 23, feeder 25 and fingers 24 so that this fruit is deposited into the numerous holders 14 as they travel beneath said fingers. At the time the holders receive the fruit or vegetables the weights 15 are being shifted toward the extreme inner ends of the levers 12 by the cam plate 19 and when said weights leave said plate the holders 14 will be located above the first compartment 4 and if the loads thereof are sufficiently heavy to over-balance the weights 15 the levers 12 will tilt and the fruit or the like will be discharged into said first compartment. If the loads of the holders 14 are too light to over-balance the weights when said holders are disposed above the first compartment, however, this will take place above the second compartment after the first cam 30 has shifted said weights inwardly toward the fulcrums of the levers, that is if the weight of the vegetables or the like is sufficient to now over-balance the weights 15. The succeeding cams 30 operate in the same manner upon the weights 15 and gradually move them closer to the fulcrums 13 and thus at some time during the rotation of the table, the loads of the numerous holders 14 are capable of over-balancing the weights 15 whereupon they are discharged into one of the compartments 4 according to their weight.

It is to be observed that the weights 15 not only slide upon the levers 12 but on the table 10, thus insuring that they be not adjusted accidentally by vibration of the machine, by centrifugal force, or other means, this being deemed quite a salient feature of the invention. Particular emphasis is also laid upon the manner of mounting the cams 30 so as to permit adjustment thereof, thus allowing the fruit or vegetables to be properly distributed within the numerous compartments 4. This arrangement is also of advantage since it permits the machine to be adjusted for grading different kinds of fruits and vegetables. For instance, if comparatively light fruit or the like is to be sorted by the machine, it is obvious that it is necessary to shift the weights 15 farther toward the fulcrums of the levers 12 than it is when sorting heavy fruit. This variable shift may be had by adjusting the carriages 27 to the proper positions upon the tracks 26 so that the cams 30 will be disposed farther outward or inward as the case may be.

From the foregoing taken in connection with the accompanying drawings it will be seen that although the machine is comparatively simple and inexpensive, it will be highly efficient and durable. For these reasons the construction shown and described constitutes the preferred form of the machine. It is to be understood, however, that within the scope of the invention as claimed numerous changes may be made without sacrificing the principal advantages.

I claim:

1. A vegetable or fruit grading machine comprising a rotating table, a plurality of radially disposed levers fulcrumed on said table, fruit or vegetable receivers on said levers, balancing weights slidable on said levers, radially disposed tracks above the table, cams mounted slidably on said tracks for shifting the weights along the levers, and means for holding said cams in adjusted position.

2. A fruit or vegetable separator comprising a rotating table, a plurality of radially disposed levers fulcrumed thereon, fruit or vegetable receivers on said levers, balancing weights slidable along said levers, radiating arms spaced above the table, tracks carried by said arms and extending longitudinally thereof, carriages slidable on said tracks, cams carried by said carriages for shifting the weights along the levers, and means for holding said carriages in adjusted position.

3. A fruit or vegetable separator comprising a rotating table, a plurality of radially disposed levers fulcrumed on said table, fruit or vegetable receivers carried by said levers, means for overbalancing the receivers when the latter are loaded, and means for slowly decreasing the power of said balancing means to permit the loads of the receivers to tilt the levers to discharge their loads; in combination with cams spaced circumferentially around the edge of the table for returning the levers to normal position after they have tilted to discharge the loads of the receivers.

4. A fruit or vegetable separator comprising a rotating table, radially disposed levers fulcrumed on said table, fruit or vegetable receivers on said levers, balancing weights slidable on said levers, means for moving said weights along the levers as the table rotates to permit the load of the receivers to over-balance said weights, and means for returning said levers to normal position; in combination with a spirally arranged cam plate for returning the weights to the inner ends of the levers at the completion of each revolution of the table, a pivotal mounting for one end of said plate, and means for permitting radial adjustment of the other end of said plate.

5. A fruit and vegetable separator comprising a traveling support, a plurality of levers fulcrumed on said support and extending transversely of the direction of travel thereof, fruit or vegetable receivers carried by said levers, weights slidable on said levers for overbalancing the receivers when the latter are loaded, tracks spaced above the traveling support and extending transversely of the direction of travel thereof, carriages slidable on said tracks, cams carried by said carriages for shifting the weights along the levers to decrease the balancing power thereof, and means for holding said carriages in adjusted position.

6. A fruit and vegetable separator comprising a traveling support, a plurality of levers fulcrumed on said support and extending transversely of the direction of travel thereof, fruit or vegetable receivers carried by said levers, means for overbalancing the receivers when the latter are loaded, and means for slowly decreasing the power of said balancing means to permit the loads of the receivers to tilt the levers to discharge their loads; in combination with cams disposed at spaced points along the path of the traveling support for restoring the levers to their initial positions immediately after tilting thereof.

7. A fruit and vegetable separator comprising a traveling support, levers fulcrumed on said support and extending transversely of the direction of travel thereof, fruit or vegetable receivers carried by said levers, weights slidable on said levers for balancing the receivers when the latter are loaded, means for moving said weights along the levers to decrease the balancing power thereof to permit the loads of the receivers to tilt the levers to discharge said loads, and means for returning said levers to normal position after discharging said loads; in combination with an elongated cam extending obliquely of the direction of travel of the support for returning the weights to their initial positions, a pivotal mounting for one end of said cam, and means for permitting lateral adjustment of the other end thereof.

ORIN N. BOYER. [L. S.]

Done in the presence of—
W. E. LEES,
H. C. BOYER.

Copies of this patent may be obtained for five cents each, by addressing the "Commissioner of Patents, Washington, D. C."